(12) United States Patent
Heinemann et al.

(10) Patent No.: US 7,009,027 B2
(45) Date of Patent: Mar. 7, 2006

(54) METHOD FOR PRODUCING MELTABLE POLYESTERS

(75) Inventors: Klaus Heinemann, Rudolstadt (DE); Eberhard Taeger, Rudolstadt (DE); Erich Meusel, Katzhuette (DE); Wolfgang Mueller, Rudolstadt (DE)

(73) Assignee: Thueringisches Institut fuer Textil-und Kunststoff-Forschung e.V., Rudolstadt (DE)

( * ) Notice: Subject to any disclaimer, the term of this patent is extended or adjusted under 35 U.S.C. 154(b) by 50 days.

(21) Appl. No.: 10/399,189

(22) PCT Filed: Nov. 20, 2001

(86) PCT No.: PCT/DE01/04294

§ 371 (c)(1),
(2), (4) Date: Apr. 15, 2003

(87) PCT Pub. No.: WO02/42353

PCT Pub. Date: May 30, 2002

(65) Prior Publication Data

US 2004/0039137 A1 Feb. 26, 2004

(30) Foreign Application Priority Data

Nov. 21, 2000 (DE) .......................... 100 57 678

(51) Int. Cl.
*C08G 63/02* (2006.01)

(52) U.S. Cl. ................... 528/272; 264/176.1; 264/219; 428/364; 525/88; 525/89; 525/90; 525/397; 525/398; 525/271

(58) Field of Classification Search ............. 264/176.1, 264/219; 428/364; 525/88, 89, 90, 397, 398; 528/271, 272
See application file for complete search history.

(56) References Cited

U.S. PATENT DOCUMENTS 5,543,474 A * 8/1996 Kawaki et al. ............. 525/440
5,852,135 A * 12/1998 Kanai et al. ................ 525/398

FOREIGN PATENT DOCUMENTS

| DE | 20 25 071 A | 12/1970 |
| DE | 43 42 705 C2 | 6/1995 |
| EP | 0 293 713 A1 | 12/1988 |
| EP | 0 406 979 A1 | 1/1991 |

OTHER PUBLICATIONS

Gabor Kiss *In Situ Composites: Blends of Isotropic Polymers and Thermotropic Liquid Crystalline Polymers* Polymers Engineering and Science Mar., 1987, vol. 27, No. 6, pp. 410–423.

Datta et al. Annu. Tech. conf.–Soc. Plastic Eng., $49^{th}$, pp. 913–918.

Höcker et al. Makromol. Chem. 190 (1989), pp. 3294–3316.

* cited by examiner

*Primary Examiner*—Terressa Boykin
(74) *Attorney, Agent, or Firm*—ProPat, L.L.C.

(57) ABSTRACT

This invention relates to a method for producing and processing polyester block copolymers, in particular, polyester side-chain grafted, rigid side-chain and/or semi-rigid side-chain polymers. According to the invention, the monomeric units of rigid side-chain and/or semi-rigid side-chain polymers are, preferably in the melt, polycondensated together with monofunctionalized and/or difunctionalized, cyclic dicarboxylic acid anhydrides to form polymers having anhydride terminal and/or side groups. The formed polyester anhydrides are reacted with the hydroxyl groups and/or with the ester groups of meltable linear polyesters in order to form side-chain grafted, rigid side-chain and/or semi-rigid side-chained polymers and, together with meltable polyesters, they form molecularly reinforced blends. These blends can be shaped into filaments or fibers having a high orientation of the reinforcing polymer or they serve as compatibility mediators in blends consisting of a polyester matrix and of rigid side-chain and/or semi-rigid side-chain polymers. The filaments are used, in particular, in technical fields or in the carpet industry.

16 Claims, No Drawings

METHOD FOR PRODUCING MELTABLE POLYESTERS

BACKGROUND OF THE INVENTION

1. Field of the Invention

This invention relates to a process for producing polyester side chain grafted rigid and/or semirigid chained polymers which combine with fusible polyesters to form molecularly reinforced recyclable blends which are shapable into high strength filament and fiber and also serve as compatibilizers in blends composed of a polyester matrix and rigid or semirigid chained polymers.

2. Description of the Related Art

Aliphatic-aromatic polyesters are thermoplastically shapable and are widely used for producing fiber materials, film and moldings. However, owing to their structurally and morphologically based property spectrum, these inexpensive polyesters are unsuitable for applications placing particularly high demands on strength.

True, the use of inorganic reinforcing materials, especially the use of glass fiber, makes it possible to improve the strength, rigidity and dimensional stability of polyesters, but recyclability is severely compromised as a result. Such additives make it more difficult to produce thin walled moldings and film and also to achieve impeccable surfaces, however. Wholly aromatic macromolecular polyesters generally meet the strength requirements, but are difficult to process even if, as described in DE-A 20 25 071, they are thermotropic by reason of the components used.

The addition of rigid or semirigid chained thermotropic polymers to improve the mechanical properties of matrix polymer has already been described for various polymers. According to G. Kiss [Polym. Eng. And Science 27 (1987) 6, 410–423], the use of stiff or semistiff chained thermotropic liquid crystalline polymers (LCPs) in the thermoplastic processing of polyamide and polyesters gives rise to reinforcing fibrils. The substantial incompatibility of the LCP with the polymers, however, severely limits its use. According to [EP040697A1], an improved reinforcing effect is only incompletely achievable by addition of phenoxy resins as compatibilizers.

It is common knowledge that graft copolymers are useful as compatibilizers in a large number of commercially utilized polymer blends. The main chains of these macromolecules are compatible with the polymer to be dispersed, while the side chains exhibit affinity for the matrix polymer. The effectiveness of polypropylene grafted LCP compatibilizers for in situ reinforced LCP/polypropylene blends was demonstrated by Datta et al. [Annu. Tech. conf.-Soc. Plast. Eng., 49th, 913–918]. Hökeretal. [Makromol. Chem. 190 (1989), 3295] succeeded in producing stiff chained polyarylates having high molecular weight polystyrene side chains. This improved the compatibility of the produced rod-shaped graft copolymers with polystyrene to such an extent that a homogeneous phase was formed. However, none of these graft copolymers is suitable for an adequate modification of polyesteramides.

The production and use of thermotropic polyesterimides is described by Kriecheldorf et al. [EP 0 293 713]. They are said to possess excellent processability and good mechanical properties. But their production is very cost intensive. For use as a reinforcing material in linear fusible polyesters, however, their effect is inadequate.

In DE-A 43 42 705, the compatibility of rod-shaped fusible, especially thermotropic, polymers with aliphatic or aliphatic-aromatic polyamides is improved, and a molecular reinforcement achieved, by means of polyamide side chain grafted rigid or semirigid chained polymers which bear anhydride end and/or side groups. These reactive groups are capable of reacting with the amino or amide groups of the polyamide and hence of establishing, via covalent bonds, a firm link between the thermotropic polymer and the polyamide.

This firm link is not known as a reinforcing material for linear fusible polyesters, especially for filament production. Specific applications of polyester filaments in industrial sectors and carpet manufacture require enhanced strength, modulus of elasticity and dimensional stability at elevated temperatures compared with conventional types.

SUMMARY OF THE INVENTION

It is an object of the present invention to develop a recyclable meltable polyester, especially copolyesteramide, having improved mechanical properties, such as tenacity, breaking strength, that is suitable for producing filament and fiber, especially for industrial sectors and carpet manufacture.

This object is achieved when the monomeric building blocks of rigid and/or semirigid chained polymers or precondensates formed from individual monomers are conjointly polycondensed with mono- and/or difunctionalized cyclic dicarboxylic anhydrides or their precondensates to form polymers having cyclic anhydride end and/or side groups, preferably in the melt or solution, the polyesterimide anhydrides formed are reacted with the hydroxyl and/or ester groups of fusible linear polyesters in a manner according to the invention to form side chain grafted rigid and/or semirigid chained molecularly reinforced polymers. Surprisingly, these blends are also particularly useful as compatibilizers, particularly when blending aliphatic polyesters with aliphatic polyamides. The cyclic dicarboxylic anhydride end and/or side groups serve to reactively bond the thermotropic copolyesterimide to conventional polyester molecules, which leads to better dispersion in the polymer. This better dispersion serves to reinforce the copolyesterimide.

The rigid or semirigid chained polymers having side and/or end disposed cyclic dicarboxylic anhydride groups are produced according to the invention in a conventional manner from the monomers by polycondensation, preferably in the melt, using mono- and/or difunctionalized cyclic dicarboxylic anhydrides. It is similarly possible to use precondensates of mono- and/or difunctionalized dicarboxylic anhydride and one of the monomers. The anhydride groups are preserved under the polycondensation conditions and make possible the subsequent reaction with the hydroxyl or ester groups of fusible linear polyesters to produce the polyester end and/or side group grafted polymers in a manner according to the invention.

The polyester grafted copolymers are conveniently prepared according to the invention by using polyesterimides having cyclic dicarboxylic anhydride end and/or side groups, formed in the course of the reaction of 4-carboxyphthalimidohexanoic acid and/or 1,6-bis[4-carboxyphthalimido]hexane, p-acetoxybenzoic acid and hydroquinone diacetate with mono- and/or difunctionalized cyclic dicarboxylic anhydrides, in the melt at 170 to 320° C., in the form of a precondensate.

Instead of 4-carboxyphthalimidohexanoic acid it is possible to use a mixture of nylon-6 and trimellitic anhydride in a molar ratio of 1:1, this mixture being reacted in the melt with p-acetoxybenzoic acid, hydroquinone diacetate and a mono- and/or difunctionalized cyclic dicarboxylic anhydride immediately prior to the polymerization.

The polyester grafted copolymers are further advantageously prepared according to the invention by using copolyesters having cyclic dicarboxylic anhydride end and/or side groups, formed in the course of the reaction of p-acetoxybenzoic acid and also aromatic, aliphatic-aromatic or aliphatic dicarboxylic acids and hydroquinone diacetate with mono- and/or difunctionalized dicarboxylic anhydrides, preferably in the melt at 170 to 320° C.

It is similarly advantageous to prepare the polyester grafted copolymers according to the invention by using copolyesteramides having cyclic dicarboxylic anhydride end and/or side groups that as well as p-acetoxybenzoic acid contain acetyl compounds of other hydroxy carboxylic acids and in place of hydroquinone diacetate further acylated dihydric phenols and also aminophenols or aromatic amino carboxylic acids.

The mono- or difunctionalized cyclic dicarboxylic anhydrides used are aliphatic monomers, for example diacetoxysuccinic anhydride, acetoxy- and/or diacetoxyperhydrophthalic anhydride, or aromatic compounds such as trimellitic anhydride and diacetoxyphthalic anhydride.

DETAILED DESCRIPTION OF THE PREFERRED EMBODIMENTS

In a further advantageous embodiment of the process according to the invention, hydroxy compounds in the presence of acetic anhydride are used in place of the acetyl compounds for the polycondensation in the melt or solution.

The polyester grafted copolymers are preferably prepared according to the invention by the rigid or semirigid chained polymers having end and/or side disposed anhydride groups of aliphatic and/or aromatic dicarboxylic acids preferably being reacted in the melt with the hydroxyl end groups of low or high molecular weight polyesters to form block or side chain grafted polymers having a substantially unchanged molar mass distribution in the main or side chains.

A possible variation on how the polyester grafted copolymers are prepared and utilized according to the invention is the in situ reaction of the cyclic anhydride groups of preferably aromatic dicarboxylic acids in rigid or semirigid chained polymers with the matrix polyester during blend making.

Since the polyester grafted rigid or semirigid chained copolymers prepared according to the invention form microphasic and perhaps molecularly disperse alloys (polymer-polymer solutions) with fusible polyesters depending on the degree of grafting, the length of the side chains and the structure and composition of the polymer main chain, they are useful for producing dimensionally stable, high strength film, sheet and particularly filament. A further preferred use of the graft copolymers prepared according to the invention is as compatibilizers in the production and processing of in situ reinforced LCP-polyester blends.

The mechanical parameters were determined by the granules obtained being dried to a residual moisture content of less than 0.02%, spun on a high temperature spinning system into 12 filament yarn at 400 m/min and subsequently drawn in two stages on a Reifenhäuser drawing system by the spinline being led over a hot rail at 200° C. and the fiber being measured for fineness in accordance with DIN EN ISO 1973, for tenacity in accordance with ISO 527, for breaking extension in accordance with ISO 527 and for initial modulus in accordance with ISO 527.

The examples which follow illustrate the invention.

EXAMPLE 1

A 250 ml ground joint vessel equipped with stirrer, nitrogen inlet tube and distillation head is charged with the following substances:

| | |
|---|---|
| 122.1 g (0.4 mol) | of 4-carboxyphthalimidohexanoic acid |
| 52.8 g (0.2 mol) | of 3,6-diacetoxyphthalic anhydride |
| 0.1 g | of magnesium oxide |

The substances are roughly mixed and thoroughly purged with nitrogen. While the nitrogen feed continues, the mixture is melted in a metal bath at 200° C. The temperature is gradually raised to max. 240° C. with stirring while acetic acid distills off. To complete the reaction, the pressure is lowered to 2 mbar in stages. In the process, the viscosity of the melt increases greatly. After a treatment time of about 6 hours in total, the reaction vessel is removed from the bath and the still hot, viscid melt is transferred to a foil. The product is placed in a desiccator for cooling. After cooling, the precondensate is comminuted in an analytical mill and stored in the absence of moisture until needed for use in the polycondensation.

The light beige to light brown product has a carboxyl group content (potentiometric) of about 4 000 $\mu$equ./g. When the carboxyl group content found still differs greatly from the target value (3 975 $\mu$equ./g), the product is after-treated.

EXAMPLE 2

A 750 ml ground joint reaction flask equipped with stirrer, nitrogen inlet tube and distillation head is charged with the following substances needed to prepare a polyesterimide anhydride having a target molar mass of 40 000 g/mol and 6 anhydride groups/molecule:

| | |
|---|---|
| 99.58 g (0.3262 mol) | of 4-carboxyphthalimidohexanoic acid |
| 125.82 g (0.6984 mol) | of p-acetoxybenzoic acid |
| 68.92 g (0.3549 mol) | of hydroquinone diacetate |
| 2.20 g (0.01146 mol) | of trimellitic anhydride |
| 17.28 g (0.0229 mol) | of precondensate (see Example 1) |
| 0.06 g | of magnesium oxide |

The substances are roughly mixed and thoroughly purged with nitrogen. While the nitrogen feed continues, the mixture is melted in a metal bath at 200° C. The temperature is gradually raised to 260° C. (max. 280° C.) with stirring while acetic acid distills off. To complete the polycondensation, the pressure is lowered at least to 1 mbar in stages. In the process, the viscosity of the melt increases greatly. After a treatment time of about 6 hours in total, the reaction vessel is removed from the bath and the still hot, viscid melt is transferred to a foil. The product is placed in a desiccator for cooling. After cooling, the product is comminuted in an analytical mill and stored in the absence of moisture until needed for further use.

The light brown product is characterized by the following data:

| | |
|---|---|
| carboxyl group content | 158 $\mu$equ./g (1 carboxyl group = 1 anhydride group) |
| acetyl group content | 1.1 $\mu$equ./g |
| relative solution viscosity | 1.32 |

The carboxyl and acetyl group content suggest a molar mass of about 37 710 g/mol. The product has a melting point of 120° C. and at about 130° C. starts to form the anisotropic phase which does not become isotropic until 292° C. The product is thus liquid crystalline.

EXAMPLE 3

A 750 ml ground joint reaction flask equipped with stirrer, nitrogen inlet tube and distillation head is charged with the following substances needed to prepare a polyesterimide anhydride having a target molar mass of 60 000 g/mol and 10 anhydride groups/molecule:

| | |
|---|---|
| 119.66 g (0.392 mol) | of 4-carboxyphthalimidohexanoic acid |
| 152.77 g (0.848 mol) | of p-acetoxybenzoic acid |
| 83.11 g (0.428 mol) | of hydroquinone diacetate |
| 1.54 g (0.008 mol) | of trimellitic anhydride |
| 24.15 g (0.032 mol) | of precondensate (see Example 1) |
| 0.06 g | of magnesium oxide |

The substances are roughly mixed and thoroughly purged with nitrogen. While the nitrogen feed continues, the mixture is melted in a metal bath at 200° C. The temperature is gradually raised to 280° C. (max. 290° C.) with stirring while acetic acid distills off. To complete the polycondensation, the pressure is lowered at least to 1 mbar in stages. In the process, the viscosity of the melt increases greatly. After a treatment time of about 8 hours in total, the reaction vessel is removed from the bath and the still hot, viscid melt is transferred to a foil. The product is placed in a desiccator for cooling. After cooling, the product is comminuted in an analytical mill and stored in the absence of moisture until needed for further use.

The light brown product is characterized by the following data:

| | |
|---|---|
| carboxyl group content | 151 μequ./g (1 carboxyl group = 1 anhydride group) |
| acetyl group content | 0 μequ./g |
| relative solution viscosity | 1.44 |

The carboxyl group content suggests a molar mass of about 66 230 g/mol. The product has a melting point of 150° C. and at about 170° C. starts to form the anisotropic phase which does not become isotropic until 280° C.–300° C. The product is thus liquid crystalline.

In the case of batches with a high target molar mass, a longer treatment time may be needed to complete the polycondensation. This longer treatment time may also be embodied as a postcondensation.

EXAMPLE 4

A 250 ml ground joint reaction flask equipped with stirrer, nitrogen inlet tube and distillation head is charged with the following substances needed to prepare a polyesterimide anhydride having a target molar mass of 15 000 g/mol and 4 anhydride groups/molecule:

| | |
|---|---|
| 38.16 g (0.125 mol) | of 4-carboxyphthalimidohexanoic acid |
| 27.02 g (0.150 mol) | of p-acetoxybenzoic acid |
| 30.10 g (0.155 mol) | of hydroquinone diacetate |
| 1.92 g (0.010 mol) | of trimellitic anhydride |
| 7.07 g (0.010 mol) | of precondensate formed from 4-carboxyphthalimidohexanoic acid and diacetoxysuccinic anhydride (similary to Example 1) |
| 0.01 g | of magnesium oxide |

The substances are roughly mixed and thoroughly purged with nitrogen. While the nitrogen feed continues, the mixture is melted in a metal bath at 200° C. The temperature is gradually raised to 270° C. (max. 290° C.) with stirring while acetic acid distills off. To complete the polycondensation, the pressure is lowered at least to 1 mbar in stages. In the process, the viscosity of the melt increases greatly. After a treatment time of about 7 hours in total, the reaction vessel is removed from the bath and the still hot, viscid melt is transferred to a foil. The product is placed in a desiccator for cooling. After cooling, the product is comminuted in an analytical mill and stored in the absence of moisture until needed for further use.

The brownish product is characterized by the following data:

| | |
|---|---|
| carboxyl group content | 235 μequ./g (1 carboxyl group = 1 anhydride group) |
| acetyl group content | 4 μequ./g |
| relative solution viscosity | 1.32 |

EXAMPLE 5

990 g of intensively dried polyethylene terephthalate (water content <0.05%) having an intrinsic viscosity of 0.8823 dl/g are placed in a drum and 4 g of butyl stearate are added, followed by 10 g of finely ground polyesterimide anhydride having a molar mass of 30 500 g/mol and containing 6 anhydride groups/molecule, before everything is intimately mixed for 20 minutes. All the while, care is taken to exclude atmospheric moisture.

The chip is melted in a ZSK 25 twin screw extruder in the course of an average residence time of 120 seconds. The mixing operation is carried out at >200 revolutions/min and at a temperature of 270° C.

The melt is extruded into a waterbath, pulled out into a strand, chipped and dried.

The chip obtained is notable for an increased intrinsic viscosity of 0.8924 dl/g and is useful for producing filament. The carboxyl group content of modified polyester remains unchanged.

Scanning electron micrographs indicated particle sizes from 720 to 880 nm in the polymer matrix.

The mechanical properties recited hereinbelow were tested by processing the product into filament. The following values were obtained:

| | |
|---|---|
| fineness: | 8.92 tex |
| breaking extension: | 24.6% |
| tenacity: | 24.21 cN/tex |
| tensile modulus of elasticity: | 10 986 MPa |

A comparison with virgin polyethylene terephthalate without LCP additive revealed the following values:

| | |
|---|---|
| fineness: | 9.12 tex |
| breaking extension: | 27% |
| tenacity: | 17.24 cN/tex |
| tensile modulus of elasticity: | 7 791 MPa |

EXAMPLE 6

900 g of intensively dried polyethylene terephthalate (water content <0.05%) having an intrinsic viscosity of 0.7710 dl/g are intensively mixed with 100 g of chipped polyesterimide anhydride having a molar mass of 40 640 g/mol and containing 4 anhydride groups/molecule in a drum and then reacted therewith in a twin screw extruder at 270° C. and a screw speed of 250 rpm in the absence of moisture. The residence time is 180 seconds.

After the melt has been discharged and chipped, the reaction product is gently dried at 80° C.

The intrinsic viscosity post reactive extrusion has increased to 0.8324 dl/g. The Melt Flow Index (MFI) was found to be 26.9 g/10 min. The carboxyl group content has risen by 60 μequ./g. The characteristic anhydride band in the IR spectrum at 1 739 $cm^{-1}$ has disappeared.

The mechanical properties recited hereinbelow were tested by processing the product into filament. The following values were obtained:

| | |
|---|---|
| fineness: | 9.14 tex |
| breaking extension: | 27% |
| tenacity: | 21.9 cN/tex |
| tensile modulus of elasticity: | 10 117 MPa |

EXAMPLE 7

925 g of an intensively dried polyethylene terephthalate (water content <0.05%) having a carboxyl group content of 19.3 μequ./g and an intrinsic viscosity of 0.7912 dl/g are intimately mixed with 75 g of Stabaxol KE 8059 and reacted therewith in a ZSK 25 twin screw extruder at 270° C. in the course of an average residence time of 120 seconds.

After chipping and drying, the product was found to have a carboxyl group content of 0 μequ./g and an intrinsic viscosity of 0.7716 dl/g.

This chip is likewise reacted with 10% of the polyester anhydride used in Example 6 under the same conditions and again in the absence of moisture. The carboxyl group content remains at 0 μequ./g.

The carboxyl and acetyl group content suggest a molar mass of about 16 740 g/mol. The product has a melting point of 125° C. and at about 177° C. starts to form the anisotropic phase which does not become isotropic until 320° C. The product is thus liquid crystalline.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

The priority document, German Patent Application No. 100 57 678.8, filed Nov. 21, 2000 is incorporated herein by reference in its entirety.

As used herein and in the following claims, articles such as "the", "a" and "an" can connote the singular or plural.

All documents referred to herein are specifically incorporated herein by reference in their entireties.

The invention claimed is:

1. A process for production of polyester block copolymers, comprising the steps of conjointly polycondening monomeric building blocks of polymers or precondensates formed form individual monomers with mono-and/or difunctionalized cyclic dicarboxylic anhydrides or their precondensates to form polyesterimide anhydrides having anhydride end and/or side groups, and reacting the polyesterimide anhydrides with the hydroxyl and/or ester grops of fusible linear polyesters to form polyester block copolymers, the fraction of the polyesterimide anhydride being in the range from 0.1 to 11.11 mass percent, relative to the weight of the fusbile linear polyester having hydroxyland/or ester groups.

2. A process according to claim 1, wherein as monomeric building blocks 4-carboxyphthalimidohexanoic acid and/or 1,6-bis[4-carboxyphthalimido]hexane, p-acetoxybenzoic acid and hydroquinone diacetate are reacted with mono-and/or difunctionalized cyclic dicarboxylic anhydrides to form the polymestweimide anhydrides having cyclic anhydride end and/or side groups.

3. A process according to claim 1, wherein as monomeric building blocks 4-carboxyphthalimidohexanoic acid and/or 1,6-bis[4-carboxyphthalimido]hexane are reacted with p-acetoxybenzoic acid in a molar ratio of 1:2 prior to the polymerization reaction in the melt to form a precondensate.

4. A process according to claim 1, wherein as monomeric building blocks 4-carboxyphthalimidohexanoic acid and/or 1,6-bis[4-carboxyphthalimido]hexane are reacted with difunctionalized cyclic dicarboxylic anhydrides in a molar ratio of 2:1 prior to the polymerization reaction in the melt to form a precondensate.

5. A process according to claim 1, wherein as well as p-acetoxybenzoic acid acetyl compounds of other hydroxy carboxylic acids are used, for example p-acetoxyphthalic acid, and in place of hydroquinone diacetate further acetylated dihydric phenols and/or aminophenols or aromatic amino carboxylic acids are used.

6. A process according to claim 1, wherein hydroxy compounds in the presence of acetic anhydride are used for the polycondensation in the melt or solution in place of the acetyl compounds.

7. A process according to claim 1, wherein the mono-and/or difunctionalized cyclic dicarboxylic anhydrides are aliphatic and/or aromatic compounds.

8. A process according to claim 1, wherein the fusible linear polyesters having hydroxyl and/or ester groups are polyethylene terephthalate and/or polybutylene terphthalate.

9. A process according to claim 1, wherein carboxyl groups present in the polyester and/or formed in the course of the reaction are blocked by reaction with oxazolines and/or carbodiimides in the melt.

10. A process according to claim 1, wherein the polyester block copolymers are shaped into filament or fiber.

11. A process according to claim 1, wherein the polyester block copolymers are used as compatibilizers in a polymer blend of polyamides and/or polyesters.

12. A process as claimed in claim 1, wherein the mono- or difunctionalized cyclic dicarboxylic anhydrides are selected from the group consisting of diacetoxysuccinic anhydride, trimellitic anhydride and acetoxy- or diacetoxyphthalic anhydride.

13. A polyester block copolymer obtained by the process as claimed in claim 1.

14. A polyester block copolymer according to claim 13, wherein said fusible linear polyester is polyethylene terephthalate and/or polybutylene terephthalate and said polyester block copolymer exhibits liquid crystallinity.

15. A polyester block copolymer according to claim 13, wherein the tenacity of said polyester block copolymer exceeds the tenacity of said fusible linear polyester.

16. A polyester block copolymer according to claim 13, wherein the polyesterimide anhydrides exhibit liquid crystallinity.

* * * * *

UNITED STATES PATENT AND TRADEMARK OFFICE
CERTIFICATE OF CORRECTION

PATENT NO. : 7,009,027 B2
DATED : March 7, 2006
INVENTOR(S) : Klaus Heinemann et al.

It is certified that error appears in the above-identified patent and that said Letters Patent is hereby corrected as shown below:

Column 7,
Line 60, delete "form" insert -- from --.

Column 8,
Line 3, delete "fusbile" insert -- fusible --.
Line 10, delete "polymestweimide" insert -- polyesterimide --.
Lines 25-26, delete "for example p-acetoxyphthalic acid,".

Signed and Sealed this

Sixteenth Day of May, 2006

JON W. DUDAS
*Director of the United States Patent and Trademark Office*